United States Patent
Larsen et al.

(10) Patent No.: US 8,425,059 B2
(45) Date of Patent: Apr. 23, 2013

(54) LOW POWER RETRO-REFLECTIVE COMMUNICATIONS SYSTEM AND METHOD

(75) Inventors: Ty Aaby Larsen, Everett, WA (US); Henry V. Fletcher, III, Everett, WA (US)

(73) Assignee: The Boeing Company, Chicago, IL (US)

( * ) Notice: Subject to any disclaimer, the term of this patent is extended or adjusted under 35 U.S.C. 154(b) by 293 days.

(21) Appl. No.: 12/628,986

(22) Filed: Dec. 1, 2009

(65) Prior Publication Data

US 2011/0128625 A1 Jun. 2, 2011

(51) Int. Cl.
*G02B 5/12* (2006.01)

(52) U.S. Cl.
USPC .......................................................... 359/527

(58) Field of Classification Search .................. 359/527, 359/529–530, 534–544, 546; 398/118–131, 398/140–181
See application file for complete search history.

(56) References Cited

U.S. PATENT DOCUMENTS

| | | | |
|---|---|---|---|
| 6,045,230 A | 4/2000 | Dreyer et al. | |
| 6,154,299 A * | 11/2000 | Gilbreath et al. | 398/170 |
| 6,985,274 B2 | 1/2006 | Kubaink | |
| 7,054,563 B2 * | 5/2006 | Tsumura | 398/169 |
| 7,345,804 B1 | 3/2008 | Sayyah et al. | |
| 7,950,812 B2 * | 5/2011 | Roes et al. | 359/529 |
| 2002/0149721 A1 | 10/2002 | Minoura et al. | |
| 2006/0170633 A1 | 8/2006 | Satoh | |
| 2007/0064296 A1 | 3/2007 | Fathimulla et al. | |
| 2007/0273948 A1 * | 11/2007 | Roes et al. | 359/222 |
| 2009/0010644 A1 * | 1/2009 | Varshneya et al. | 398/33 |
| 2009/0232509 A1 | 9/2009 | Heikenfeld et al. | |
| 2010/0265558 A1 | 10/2010 | Leister et al. | |

FOREIGN PATENT DOCUMENTS

| | | |
|---|---|---|
| DE | 102007063382 | 7/2009 |
| JP | 6265835 | 9/1994 |
| WO | 2005/041450 | 5/2005 |
| WO | 2007/082070 | 7/2007 |
| WO | 2008/017864 | 2/2008 |
| WO | 2010/063984 | 6/2010 |

OTHER PUBLICATIONS

GB, Combined Search and Examination Report, Application No. GB1020380.0 (Mar. 18, 2011).

* cited by examiner

*Primary Examiner* — Jennifer L. Doak
(74) *Attorney, Agent, or Firm* — Matthew Lussier (57) ABSTRACT

Presented is a low-power retro-reflective communication system that reflects modulated light back in substantially the same direction as the light source using a retro-reflector. The light modulator in the retro-reflector modulates the light in response to a stimulus, such as an electrical communications stimulus or an environmental stimulus. In embodiments, the retro-reflector is a corner-cube retro-reflector and the modulator is one of the reflecting surfaces, or a spherical retro-reflector and the light modulator is a variably reflecting backing.

11 Claims, 9 Drawing Sheets

LOW POWER RETRO-REFLECTIVE COMMUNICATIONS SYSTEM AND METHOD

FIELD

Embodiments of the subject matter described herein relate generally to a system and method for utilizing variable retro-reflectors in self-aiming extremely low power communication devices and indications transmitters.

BACKGROUND

Both corner cube retro-reflectors and spherical retro-reflectors are optical designs that redirect an incoming beam of incident light from a wide range of viewable angles back towards the source of the incident light without the need for moving optics or other assemblies.

Corner cube retro-reflectors make use of angled reflecting surfaces to reflect incident light back to the source. Corner cube retro-reflectors can have exposed protruding reflective surfaces, such as polished metal or other coated surfaces, or can be internally reflective, for example lenses cut to have an internal corner at one end and a face to receive light at the other end. Incident light that enters the corner-cube is reflected between the surfaces such that it exits in the same direction as the light entered.

Spherical retro-reflectors utilize beads that are embedded in a reflective material, such that incident light enters the front of the bead, is refracted as it enters the bead, is reflected by the reflective material at the back of the bead, and is again refracted by an equal amount as it exits the bead. In this manner, the incident light is returned in the same directions as the light entered.

U.S. Pat. No. 6,045,230 to Dreyer et al. describes a Modulating Retroreflective Article having a back surface and a front surface separated by a distance. The back surface has alternating retro-reflective areas and separation areas and the front surface has alternating areas of different transmission characteristics. The Modulating Retroreflective Article modulates the incident light based on the relative displacement of the back and front surfaces and the angle of the incident light. Physical movement of the article or changes in the angle of incident light modulates the light and therefore can be used to transmit information. However the system is not adapted to a communications system. Moreover, a system that requires physical movement limits the data rate at which information can be transmitted, both because physical systems have limits as to how quickly they can be moved to cause the modulation, and because there is a limit as to how accurately the physical changes can be transformed into detectable modulations. Moreover, systems that rely upon physically moving elements are susceptible to system noise such as vibration and other perturbations of physical systems. The use of a physically spaced plate in front of the retroreflector also reduces viewable area of the reflector component, while imposing a reduced effective operating angle for the entire assembly as light will be blocked or interfered with by the front mask as incident angle increases.

SUMMARY

Presented is a system and method for a low-power retro-reflective communication device implementing self-aiming color-changing modulation elements whereby the reflective properties of the retroreflector itself is varied, thereby eliminating any external mechanisms that would interfere with the incident light. The system and method uses retro-reflective elements to achieve self-aiming for the communication device, and color-changing elements to encode information for the communications aspect of the communications device. In embodiments, the retro-reflective elements are based on corner-cube retro-reflector type designs or spherical retro-reflector type designs. In embodiments, the color-changing elements are photonic crystals, thin films, bi-static displays, MEMS elements, and other technologies capable of transforming incident light based on a stimulus. In embodiments, the stimulus is an electrical stimulus, an electrostatic stimulus, a magnetic stimulus, an electromagnetic stimulus, an optical stimulus, a pressure stimulus, a temperature stimulus, a biological stimulus, or a chemical stimulus.

In an embodiment, instead of actively generating its own electromagnetic radiation, the low-power retro-reflective communication device utilizes the incoming electromagnetic radiation of a remote system, for example an interrogation system, for communicating information back to the interrogation system. The interrogation system sends electromagnetic radiation, for example continuous light, towards the low-power retro-reflective communication device which modulates and reflects the incident light, and returns this modulated light back in the direction of the interrogation system as a communications signal.

The features, functions, and advantages discussed can be achieved independently in various embodiments of the present invention or may be combined in yet other embodiments further details of which can be seen with reference to the following description and drawings.

BRIEF DESCRIPTION OF THE DRAWINGS

The accompanying figures depict various embodiments of the low-power retro-reflective communication device system and method. A brief description of each figure is provided below. Elements with the same reference number in each figure indicated identical or functionally similar elements. Additionally, the left-most digit(s) of a reference number indicate the drawing in which the reference number first appears.

DETAILED DESCRIPTION

Figure 1A:
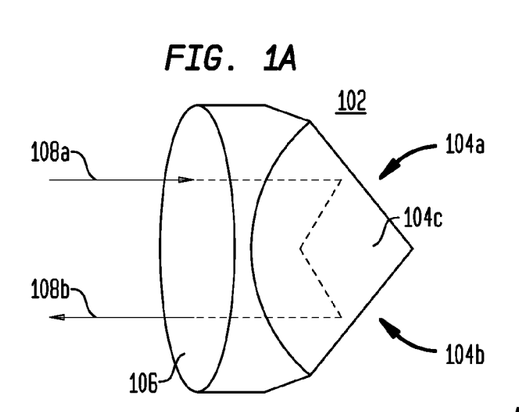
FIG. 1a is a diagram of a corner cube retro-reflector utilizing orthogonally protruding mirrored surfaces in one embodiment of a low-power retro-reflective communication system.
Figure 1B:
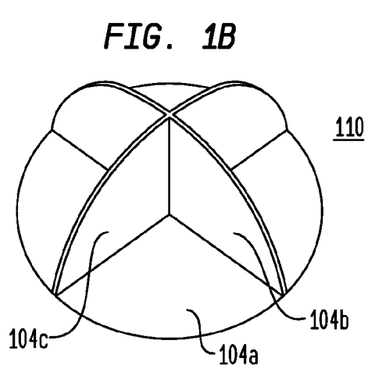
FIG. 1b is a diagram of a corner cube retro-reflector utilizing internal orthogonal mirrored surfaces in one embodiment of a low-power retro-reflective communication system.
Figure 1C:
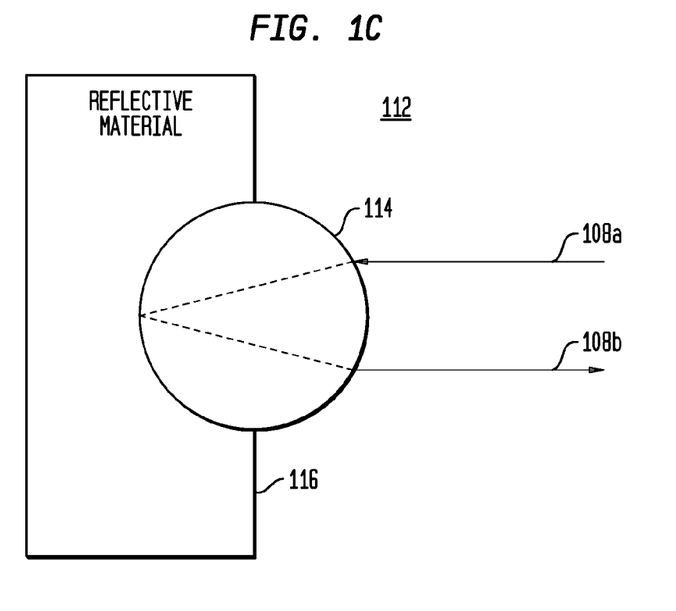
FIG. 1c is a diagram of a spherical retro-reflector with a reflective backing in one embodiment of a low-power retro-reflective communication system.

The following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.
System Components Referring now to FIG. 1a, an internally reflecting corner cube retro-reflector 102 made of a clear lens material has been cut to have an internal corner with reflecting surfaces 104a, 104b, and 104c at one end and a face 106 that receives the incident light 108a at the other end. Incident light 108a that enters the corner-cube is reflected between the reflecting surfaces 104a, 104b, 104c such that the incident light 108a exits the face 106 in the same direction 108b as the light entered the face 106. FIG. 1b is a corner cube retro-reflector 110 that includes multiple protruding reflecting surfaces 104a, 104b, 104c that are orthogonally angled to one another and reflect incident light 108a back in the direction 108b of the source of the light. FIG. 1c is a spherical retro-reflector 112 with a spherical bead 114 that receives the incident light 108a, a reflective backing 116 that reflects the incident light 108a back in the direction 108b of the source of the light. The term light is used throughout this disclosure for convenience only and is intended to include any frequency of electromagnetic radiation, both in the visible frequencies and above or below the visible frequencies of light, except where visible frequencies of light are specifically referred to in the disclosure. As one of ordinary skill in the art would appreciate, the aspects of the present disclosure could be applied to infrared light, radio frequency radiation, radar applications, etc.

Figures 2A, 2B:
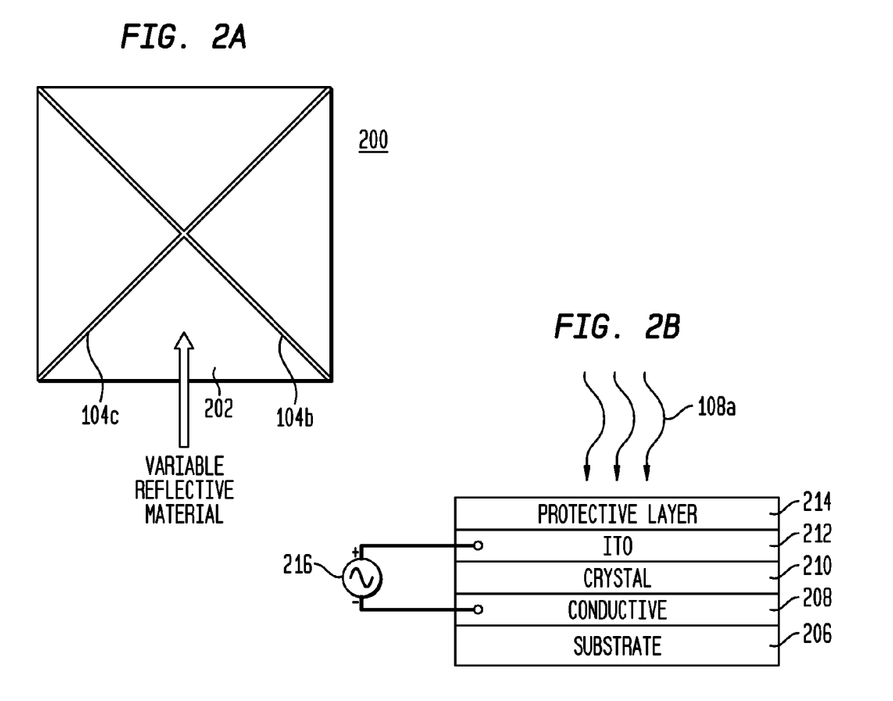
FIG. 2a is a diagram of a corner cube retro-reflector utilizing orthogonally protruding surfaces and variably reflective material in one embodiment of a low-power retro-reflective communication system.
FIG. 2b is a diagram of the layers of a variably reflective material in one embodiment of a low-power retro-reflective communication system.

Referring now to FIG. 2a, an embodiment of a variably reflective corner cube retro-reflector 200 utilizing orthogonally protruding surfaces and a variably reflective backing is presented. The variably reflective corner cube retro-reflector 200 is similar to the corner cube retro-reflector 110 of FIG. 2b, except that one or more of the reflective surfaces 104a, 104b, 104c is replaced with a variably reflective surface 202. In an embodiment, the variably reflective surface 202 is a thin film photonic crystal 204. In an embodiment, the thin film photonic crystal 204 is comprised of a glass or plastic substrate 206, a conducting layer 208, for example a layer of Indium Tin Oxide (ITO) or metal, the photonic crystal layer 210, a transparent conducting layer 212, for example a layer of ITO, and a protective coating 214, for example a layer of glass or plastic. Incident light 108a penetrates the protective coating 214 and transparent conducting layer 212 and hits the photonic crystal layer 210. The reflectance of the photonic crystal layer 210 is changed by varying the voltage across the conductive layers 208, 212 by the modulation source 216. The photonic crystal layer 210 is selectively tune-able to specific wavelengths of light. Current generation thin film photonic crystal 204 require extremely small amounts of power, for example a few microamps at approximately 3 volts.

To use variably reflective corner cube retro-reflector 200 as a communications device, the reflectance of the photonic crystal layer 210 is transitioned from a reflective state for a particular wavelength of incident light 108a, to a non-reflective state, thus effecting an on/off binary communications modes. Coding of the on/off states into a standard or non-standard serial bit stream is well known in the art. In other embodiments, the photonic crystal layer 210 is transitioned into multiple states of reflectance, partial reflectance, and non-reflectance to increase the effective amount of information per transition. In embodiments, the incident light 108a is monochromatic. In embodiments, the incident light 108a is white light, and the full operating band of the thin film photonic crystal 204 is utilized to modulate the white light into colored light by reflecting or absorbing different wavelengths of the white light. In one embodiment, a color-capable CCD or Charge Coupled Device camera is positioned near the light source to detect the color of the variably reflective corner cube retro-reflector 200. In embodiments, an array of variable retro-reflectors operate in unison to increase the amount of information returned via modulated light.

Photonic crystals are easy to manufacture, have low current requirements, can operate as bi-stable materials, meaning that once in an on or off state, little to no power is required to maintain that on or off state, and are easily scalable for small or large designs. Photonic crystals can also be considered multi-stable with the ability of being transitioned across a large gamut of reflective states, and then holding their set state upon removal of power. In an embodiment, the voltage applied to the variably reflective corner cube retro-reflector 200 is based on the value of a sensor, for example a sensor to detect local temperature. The ultra-low current and voltage operation and lack of any need for specialized tracking optics or high powered interrogation sources makes the variably reflective corner cube retro-reflector 200 attractive for low cost "disposable" sensor systems, energy harvesting devices, and "peel-and-stick" style sensing systems.

Figure 2C:
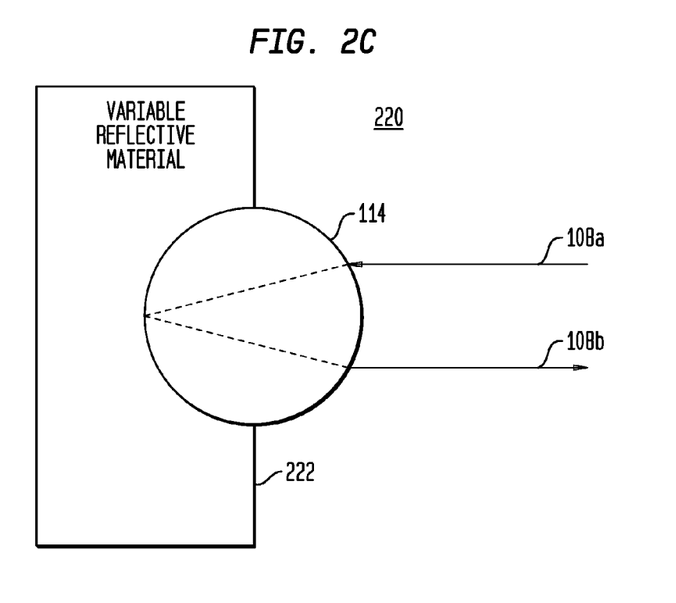
FIG. 2c is a diagram of a spherical retro-reflector with a variably reflective backing in one embodiment of a low-power retro-reflective communication system.

FIG. 2c is a diagram of a variably reflective spherical retro-reflector 220 with a variably reflective backing 222. Incident light 108a enters the spherical bead 114, and is variably reflected back in the direction 108b of the source of the light. In embodiments, the variably reflective backing 222 is comprised of a thin film photonic crystal 204. The variably reflective spherical retro-reflector 220 operates similarly to the variably reflective corner cube retro-reflector 200.

Operation

Using retro-reflective elements allows a low-power retro-reflective communication device to be self-aiming, thereby reducing the need for power or time to correctly aim the communications device. In embodiments the low-power retro-reflective communication device is passive, in that it does not generate the electromagnetic radiation used to communicate with another remote system. Generating electromagnetic radiation to communicate with another remote system can require significant amounts of power dependant on range and application. A communications device that generates electromagnetic radiation not only requires a power source, such as a battery, solar cell, or fuel cell, but also power conditioning circuitry to regulate the power to a desired voltage, current, or power, and an oscillator to generate the desired frequency of electromagnetic radiation for transmission and communication with the remote system.

The power conditioning circuitry, and circuitry associated with the oscillator and modulator all consume power from the battery, solar cell, or fuel cell, some of which is wasted as heat. A system that generates its own electromagnetic radiation therefore requires relatively large batteries, solar cells, or fuel cells. By relatively large, it is meant that the batteries, solar cells, or fuel cells are relative large compared with the circuitry, which can be extremely small using solid state and mix-mode fabrication methods. In such systems, power is also continuously used as the system must constantly expend power to share its status, which also creates the need for ever larger energy storage methods. Eliminating the need to generate the electromagnetic radiation by the communications device reduces the amount of power needed. In embodiments, the low-power retro-reflective communication device only requires power for the modulator circuit that modulates the oscillation in order to communicate telemetry information to the remote system is necessary, allowing the use of smaller power sources.

In other embodiments, such as for sensor applications, the sensor is the modulator for the low-power retro-reflective communication device, eliminating the need to incorporate a power source in the design of the communications device. Smaller power sources makes the low-power retro-reflective communication device attractive for applications where size, weight, and battery life are important considerations, for example in spacecraft. In other embodiments, the electromagnetic energy, such as light, used to interrogate the sensor may also be used to provide power to the sensor, thereby further reducing or eliminating the need for any power storage devices at all.

Additionally, since the low-power retro-reflective communication device is passive in terms of emitting electromagnetic radiation, it allows for stealthy communications with military vehicles and personnel, making it difficult or impossible for adversaries to detect the vehicles or personnel by monitoring for sources of electromagnetic radiation. In this passive embodiment, the communications device does not emit electromagnetic radiation of its own and only reflects modulated electromagnetic radiation in a very directional manner back to the source of the incident electromagnetic radiation, making detection or interception of communications unlikely. This feature makes the low-power retro-reflective communication device attractive for applications such as IFF receivers, or identify friend-foe receivers, worn by soldiers on the battlefield who wish to remain concealed from the enemy but identifiable by friendly forces.

Embodiments and Applications

Figure 3A:
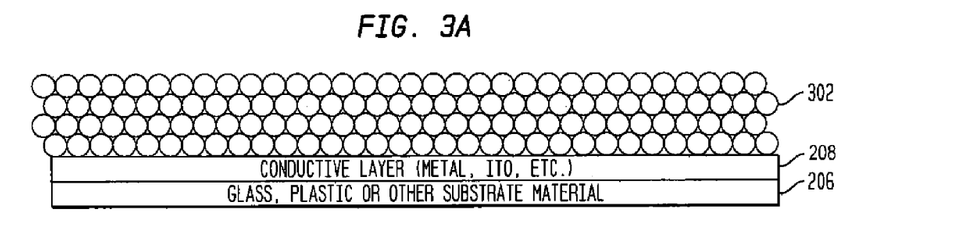
FIGS. 3a, 3b and 3c illustrate a process of creating a plurality of corner-cube-based retro reflectors with variably reflective photonic crystals in one embodiment of a low-power retro-reflective communication system.
Figure 3B:
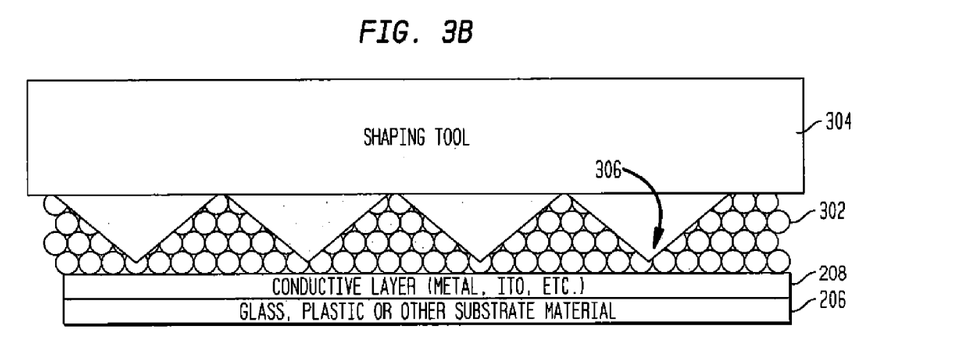
Figure 3C:
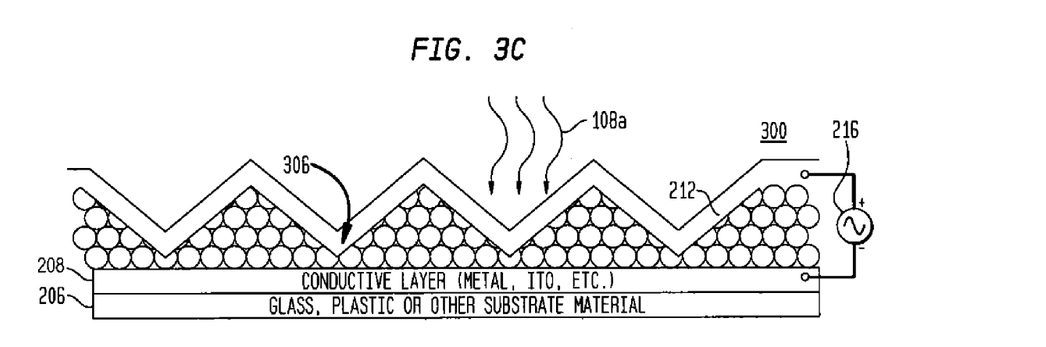

Referring now to FIGS. 3a, 3b, and 3c, an embodiment and method of manufacturing of a variably reflective internal corner cube retro-reflector 300 is illustrated. Referring now to FIG. 3a, a glass or plastic substrate 206 has a conducting layer 208, for example a metal or ITO layer, and plurality of photonic crystal beads 302. Photonic crystal beads 302 are used instead of a solid crystal as they facilitate manufacturing of the corner cubes 306 shown in FIG. 3b. Referring now to FIG. 3b, a shaping tool 304 is pushed into the photonic crystal beads 302 to form corner cubes 306 that face up towards the incident light 108 as shown in FIG. 3c. In FIG. 3c, the shaping tool 304 is removed and a transparent conducting layer 212 is coated on the photonic crystal beads 302 to both retain the shape of the corner cubes 306 and provide an electrical path to the photonic crystal beads 302 by the modulation source 216. The variably reflective internal corner cube retro-reflector 300 operates similarly to the variably reflective corner cube retro-reflector 200. In an embodiment, the shaping tool 304 is also a lens element with conductive properties and is not removed from the photonic crystal beads. In an embodiment, the shaping tool 304 or a coating on the shaping tool 304 is used as the electrical path to the photonic crystal beads 302 by the modulation source 216.

Figure 4A:
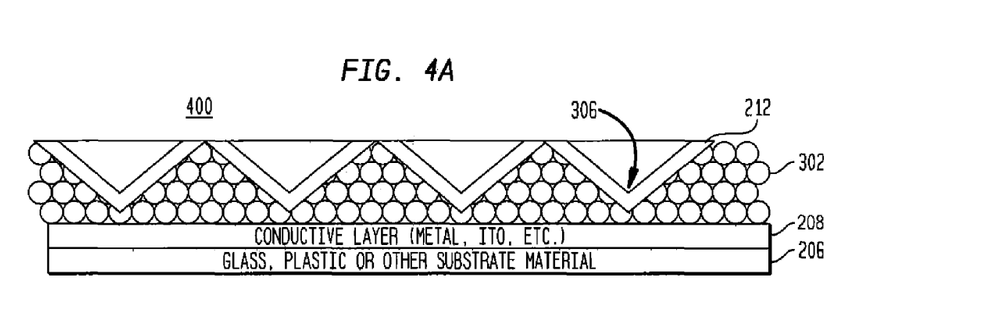
FIG. 4a is an embodiment of a corner-cube-based retro reflectors with variably reflective photonic crystals with an embedded shaping element in one embodiment of a low-power retro-reflective communication system.

FIG. 4a illustrates an embodiment of a flat variably reflective internal corner cube retro-reflector 400 where an optical element 402 coated with a transparent conducting layer 212 is positioned on the photonic crystal beads of the variably reflective internal corner cube retro-reflector 300. Having a flat optical element 402 on top and a flat bottom substrate 206 facilitates with roll-to-roll fabrication of the variably reflective internal corner cube retro-reflector 400.

Figure 4B:
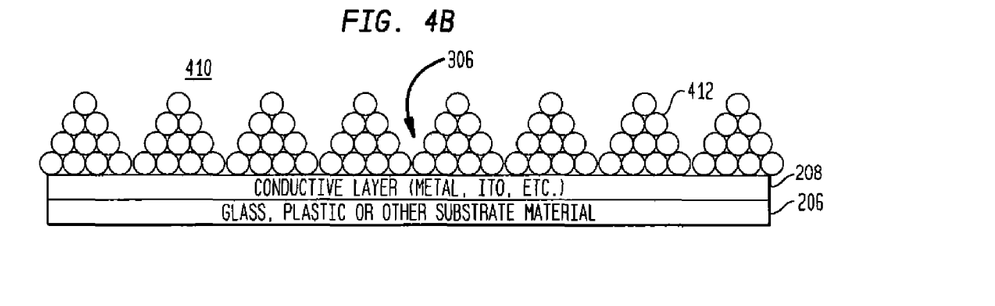
FIG. 4b is an embodiment of a corner-cube-based retro reflectors with deposited variably reflective photonic crystals in one embodiment of a low-power retro-reflective communication system.

FIG. 4b illustrates an embodiment of a deposited and/or etched variably reflective internal corner cube retro-reflector 410 where deposited photonic crystals 412 are placed in the corner cube 306 pattern directly. In embodiments, the deposited photonic crystals are beads deposited by an ink jet type processing, beads placed by small scaled positioning techniques such as electrostatic methods known in the art, chemical etching, mechanical etching, low pressure vapor deposition, or combinations thereof. The transparent conducting layer 212 is not shown, but may be deposited using similar or conventional techniques.

Figure 5:
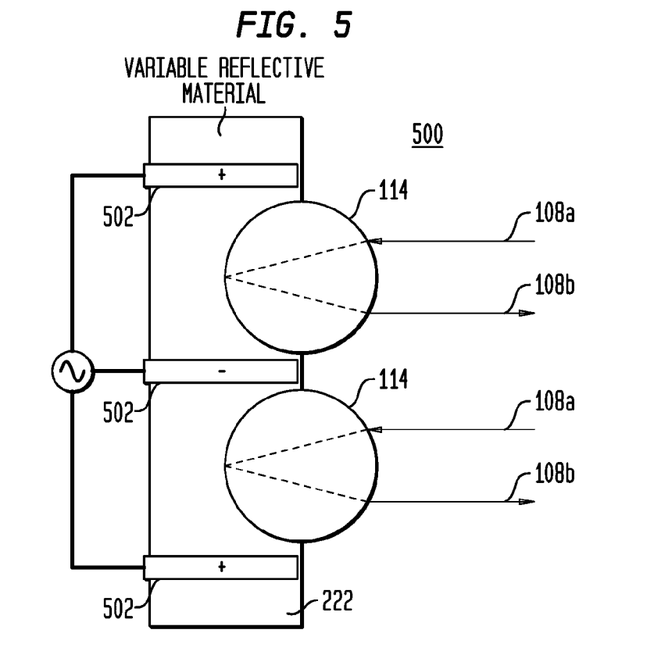
FIG. 5 is a diagram of a plurality of spherical retro reflectors with variably reflective backing in one embodiment of a low-power retro-reflective communication system.

FIG. 5 illustrates a peg-grid variably reflective spherical retro-reflector 500 similar to the variably reflective spherical retro-reflector 220 of FIG. 2c. The peg-grid variably reflective spherical retro-reflector 500 comprises a grid of pegs 502a, 502b, 502c, etc., collectively pegs 502 to apply voltage across the thin film photonic crystal 204 of the variably reflective backing 222. In an embodiment, the modulation source 216 applies voltages to the pegs 502 of the variably reflective backing 222 to modulate the transparency of the thin film photonic crystal 204. In embodiments, one or more modulation sources 216 modulate voltages to the pegs 502 of the variably reflective backing 222 to create patterns of reflectivity.

Figure 6:
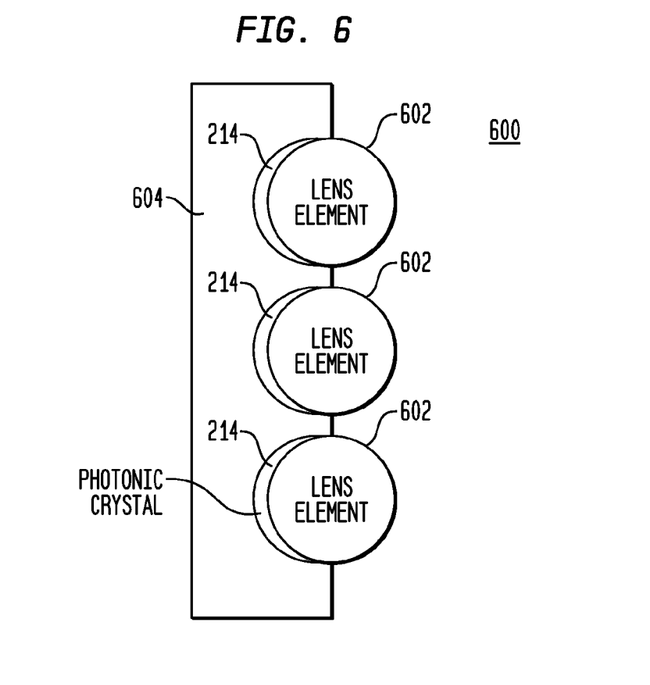
FIG. 6 is a diagram of a plurality of spherical retro reflectors with thin layer variably reflective photonic crystal coatings in one embodiment of a low-power retro-reflective communication system.

FIG. 6 illustrates a deposited bead variably reflective spherical retro-reflector 600 similar to the variably reflective spherical retro-reflector 220 of FIG. 2c. In this embodiment, a thin film photonic crystal 204 is deposited onto a portion of the deposited beads 602. The deposited beads 214 are positioned in a conductive backing 604 with the portion of the thin film photonic crystal 204 contacting the conductive backing 604 which provides the electrical conduction path to the modulation source 216 (not shown.)

Figure 7:
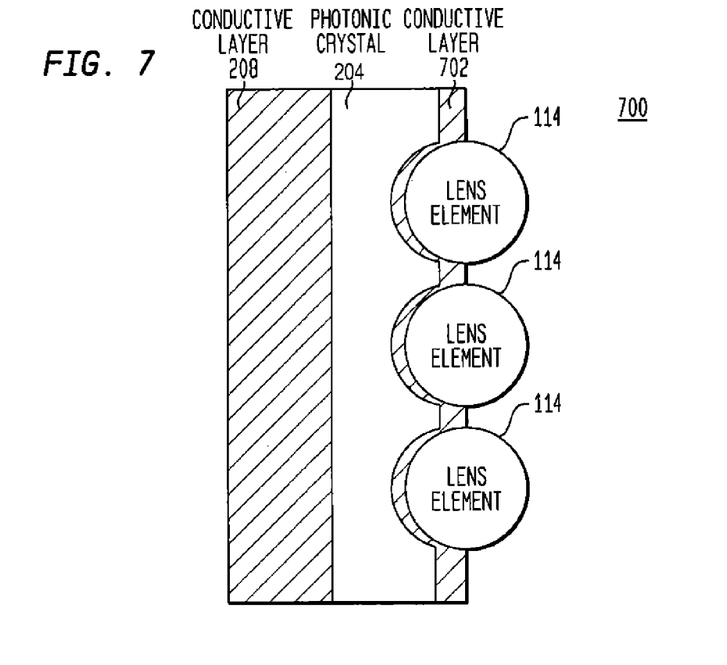
FIG. 7 is a diagram of a plurality of spherical retro reflectors with a variably reflective photonic crystal layer between conductive layers in one embodiment of a low-power retro-reflective communication system.

FIG. 7 illustrates a patterned photonic crystal variably reflective spherical retro-reflector 700 comprising a conducting layer 208, a thin film photonic crystal 204, and a patterned conducting layer 702. Spherical beads 114 fit into the patterned conducting layer 702. As shown, both the thin film photonic crystal 204 and the patterned conducting layer 702 have indents for accepting the spherical beads 114. In embodiments, any combination of the conducting layer 208, the thin film photonic crystal 204, the patterned conducting layer 702, or a protective layer (not shown) can be indented. In an embodiment, to facilitate manufacturing of the patterned photonic crystal variably reflective spherical retro-reflector 700, the conducting layer 208, the thin film photonic crystal 204, and the patterned conducting layer 702 are manufactured first and then the spherical beads 114 spread over the indents and allowed to settle into the indents.

Figure 8:
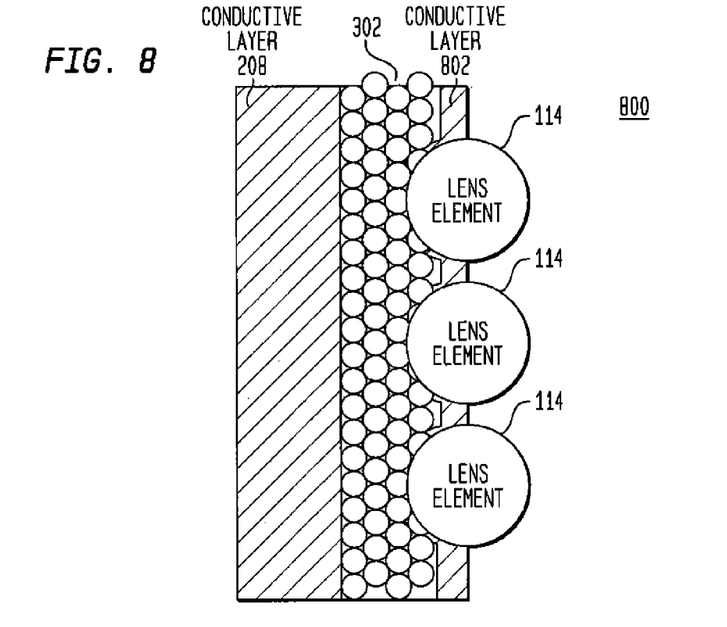
FIG. 8 is a diagram of a plurality of spherical retro reflectors with beads of variably reflective photonic crystals between conductive layers in one embodiment of a low-power retro-reflective communication system.

FIG. 8 illustrates a bead photonic crystal variably reflective spherical retro-reflector 800 comprising a conducting layer 208, a layer of photonic crystal beads 302, and a fill conducting layer 802. Spherical beads 114 are embedded into the layer of photonic crystal beads 302, and the fill conducting layer 802 coats the layer of photonic crystal beads 302 to provide the electrical conduction path for energizing the layer of photonic crystal beads 302. In an embodiment, the spherical beads 114 are pre-coated with conductive material such as ITO or comprised of ITO to provide a better electrical conduction path for energizing the layer of photonic crystal beads 302. In an embodiment, to facilitate manufacturing of the bead photonic crystal variably reflective spherical retro-reflector 800, the spherical beads 114, and the fill conducting layer 802 are mixed with conductive components and applied together as a coating to the layer of photonic crystal beads 302.

Figure 9A:
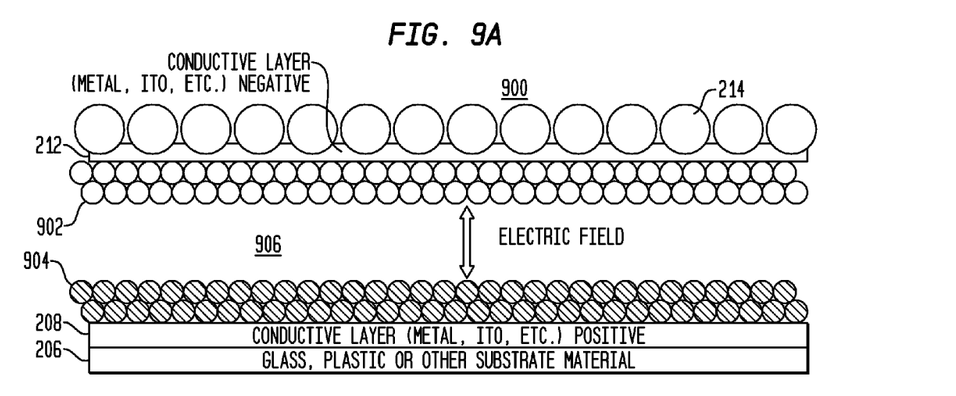
FIG. 9a is a diagram a bi-static display in one embodiment of a low-power retro-reflective communication system.

FIG. 9a illustrates a bi-static cell 900 for implementing a spherical variable retro-reflective design. The bi-static cell 900 is comprised of a glass or plastic substrate 206, a conducting layer 208, a liquid medium 906 filled with white polystyrene beads 902 and black polystyrene beads 904, a transparent conducting layer 212, and a protective coating 214. The white polystyrene beads 902 reflect light while the black polystyrene beads 904 absorb light. The white polystyrene beads 902 and black polystyrene beads 904 have different electrical charge properties such that when an electric field is applied between the conducting layer 208 and the transparent conducting layer 212, the white polystyrene beads 902 and black polystyrene beads 904 will migrate to opposite sides of the liquid medium 906. The bi-static cell 900 is grouped with other individual cells that can make pixels for a display (not shown.)

Figure 9B:
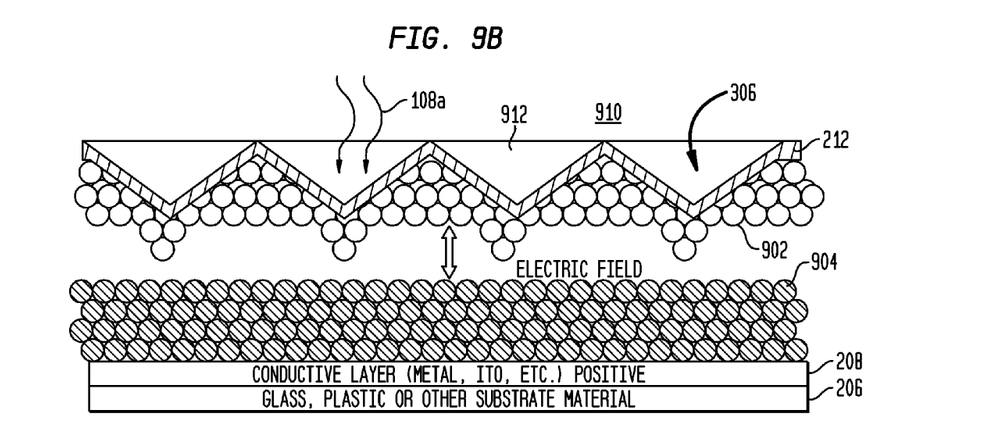
FIG. 9b is a diagram of a modified bi-static display technique with a plurality of corner-cube retro reflectors in one embodiment of a low-power retro-reflective communication system.

Referring now to FIG. 9b, a retro-reflective bi-static cell 910 for variably reflective faceted retro-reflectors is presented. The retro-reflective bi-static cell 910 is similar to the bi-static cell 900 of FIG. 9a, but instead includes a corner cube optical element 912 similar to the optical element 402 of FIG. 4a. The corner cube optical element 912 is coated with a transparent conducting layer 212, comprising for example ITO, that sets up the electric field in the liquid medium 906 with the conducting layer 208. In an embodiment, the retro-reflective bi-static cell 910 further differs from the bi-static cell 900 of FIG. 9a in that the retro-reflective bi-static cell 910 uses more white polystyrene beads 902 and black polystyrene beads 904 than the bi-static cell 900. The additional polystyrene beads 902 and black polystyrene beads 904 are used to better cover the peaks of the corner cubes 306 of the corner cube optical element 912 that project into the fluid medium 906.

Figure 10A:
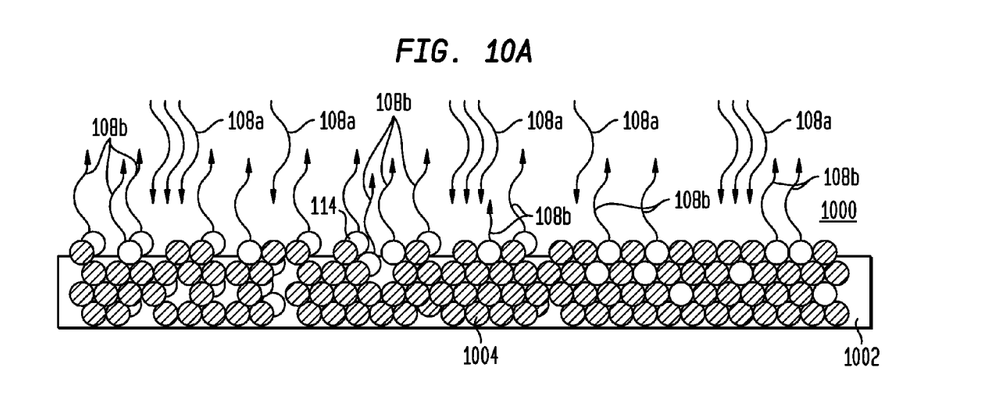
FIG. 10a is a diagram of spherical retro reflectors with variably reflective photonic crystals in a clear binder in one embodiment of a low-power retro-reflective communication system.

Referring now to FIG. 10a, a retro-reflective optical sensor 1000 is presented. The retro-reflective optical sensor 1000 comprises sensing photonic crystal beads 1004 and spherical beads 114 mixed together in a clear binder 1000. In embodiments, the clear binder 1000 is a paint that is applied to a surface, for example by spraying it on the surface. The sensing photonic crystal beads 1004 modify the incident light 108a, while the spherical optical beads retro-reflect the incident light 108b back to the source of the light. In embodiments, the sensing photonic crystal beads 1004 modulate the reflectance based on a stimulus. In embodiments, the stimulus is an electrical stimulus, an electrostatic stimulus, a magnetic stimulus, an electromagnetic stimulus, an optical stimulus, a pressure stimulus, a temperature stimulus, a biological stimulus, and a chemical stimulus. In embodiments, the stimuli directly affect the orientation of elements in the sensing photonic crystal beads 1004, thereby modulating the reflectance. The sensing photonic crystal beads 1004 of the retro-reflective optical sensor 1000 directly converts a stimulus into a detectable change in the incident light, thereby eliminating the need for a separate power source and separate electrical conduction path to the sensing photonic crystal beads 1004.

The retro-reflective optical sensor 1000 can be directly applied to an object, or applied to a substrate such as a tape or other flexible substrate. For example, if the sensing photonic crystal beads 1004 modulate the incident light 108a in the visible range based on temperature, the retro-reflective optical sensor 1000 can be applied to a person or object of interest and using a directed beam of white light, for example a flashlight, the temperature or temperature gradients can be directly observed. This could be useful as a diagnostic tool for doctors and their patients or as a safety tool for firefighters wanting to gauge the temperature of a door, ceiling, or floor for indications of fire. If the sensing photonic crystal beads 1004 modulate the incident light 108a based on pressure, the retro-reflective optical sensor 1000 can be applied to objects of interest such as mechanical structures or airplane wings to gauge static or dynamic stresses or areas of damage or cracking. If the sensing photonic crystal beads 1004 modulate the incident light 108a as a result of the presence of a chemical, for example water, the retro-reflective optical sensor 1000 can be applied to a paint for example to enhance visibility of road lines during rainy weather or visibly indicate other slick conditions due to oil or other chemical components on the road. Similarly, if sensing photonic crystal beads 1004 modulate the incident light 108a as a result of the presence or absence of other light, the retro-reflective optical sensor 1000 can be applied to a paint for example to enhance visibility of road lines during daylight hours, but reduce the retro-reflectivity or shift spectrum during nighttime to prevent blinding or overpowering drivers with reflected light.

Figure 10B:
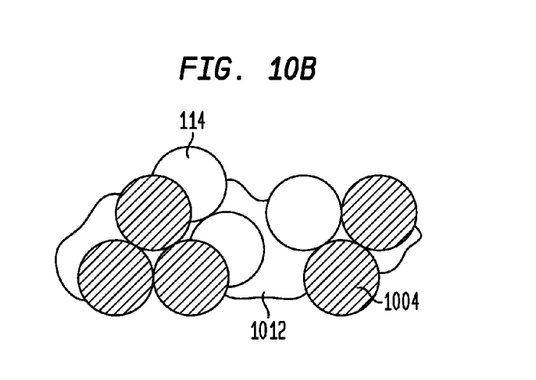
FIG. 10b is a diagram of clusters of spherical retro reflectors with variably reflective photonic crystals for use in a colloidal suspension in one embodiment of a low-power retro-reflective communication system.

Referring to FIG. 10b, a retro-reflective optical sensor dust 1010 is presented. The retro-reflective optical sensor dust 1010 is similar to the retro-reflective optical sensor 1000 of FIG. 10a but comprises combining a plurality of sensing photonic crystal beads 1004 and a plurality of spherical beads 114 together and affixing them to one another using clear binder 1000. The retro-reflective optical sensor dust 1010 can be dispersed into the air or into a liquid as a colloidal suspension to provide measurements of air temperature or fluid dynamics.

Figure 11A:
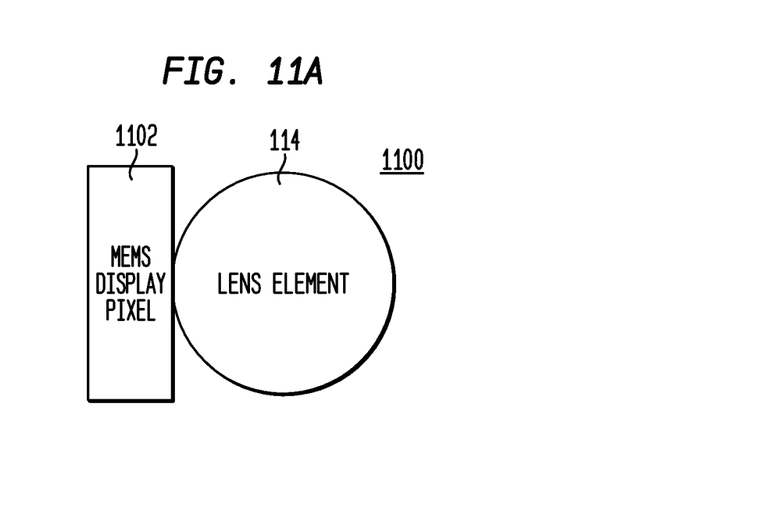
FIG. 11a is a diagram of aspherical retro reflector and MEMS display pixel in one embodiment of a low-power retro-reflective communication system.
Figure 11B:
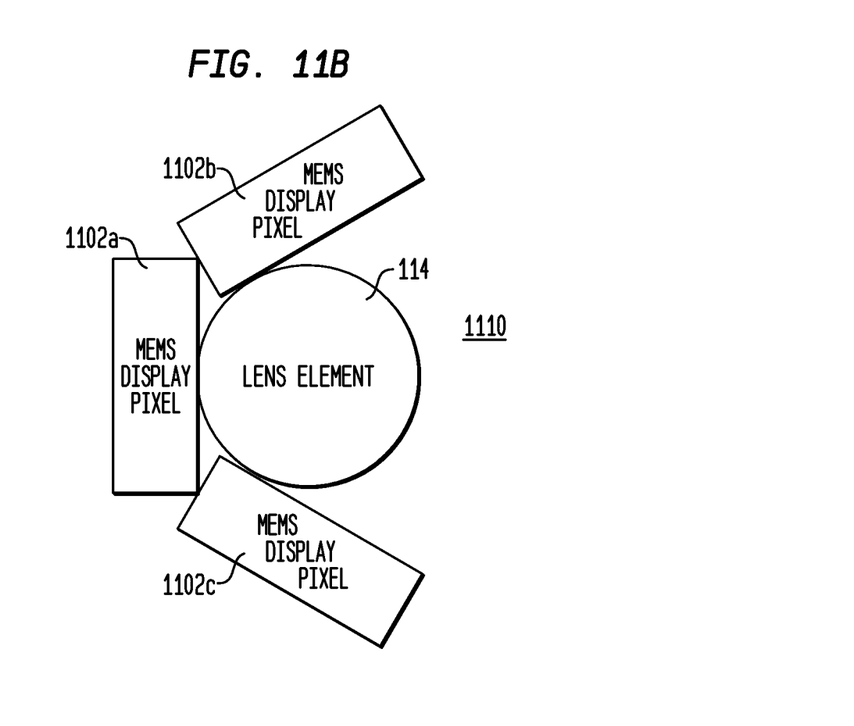
FIG. 11b is a diagram of a spherical retro reflector and a plurality of MEMS display pixels in one embodiment of a low-power retro-reflective communication system.

Referring to FIGS. 11a and 11b, a retro-reflective display pixel 1100 and a multi-angle retro-reflective display pixel 1110 are presented. The retro-reflective display pixel 1100 reflects light back towards a light source based upon the color presented on the MEMS display pixel 1102. A display made up of an array of retro-reflective display pixels 1100 would direct light back principally to a viewer who is illuminating the display. This would allow highly directional viewing of a computer display or television display and prevent others from viewing the display, either for reasons of privacy or courtesy. Moreover, because the majority of the light emitted is directed towards the viewer and not dispersed across a wide viewing angle, a display utilizing retro-reflective display pixels 1100 would be brighter and have a greater range of contrast. Further, because less overall energy would be constantly directed at each MEMS display pixel 1102 element, the usable life span of the MEMS display pixel 1102 elements would be greatly increased.

Referring now to FIG. 11b, a display made up multi-angle retro-reflective display pixels 1110 would allow different programming to be concurrently viewed by different people, or allow different displays to be presented to the left and right eyes of a single viewer, thus aiding in stereo or 3D viewing of programming on the display.

The embodiments of the invention shown in the drawings and described above are exemplary of numerous embodiments that may be made within the scope of the appended claims. It is contemplated that numerous other configurations of the low-power retro-reflective communication system and method may be created taking advantage of the disclosed approach. It is the applicant's intention that the scope of the patent issuing herefrom will be limited only by the scope of the appended claims.

What is claimed is:

1. A system, comprising:
    a substrate;
    a first electrical conduction layer on said substrate;
    a plurality of photonic crystal beads in electrical communication with said first electrical conduction layer;
    a second optically transparent electrical conduction layer in electrical communication with said plurality of photonic crystal beads; and
    a plurality of retro-reflective elements in optical communication with said plurality of photonic crystal beads, and
wherein said photonic crystal beads modulate a reflectivity of said plurality of spherical retro-reflective elements in response to an electric stimulus from said first electrical conduction layer and said second optically transparent electrical conduction layer.

2. The system of claim 1, wherein said plurality of retro-reflective elements are spherical beads.

3. The system of claim 1, wherein said plurality of retro-reflective elements are spherical beads, each having a least a portion that is electrically conductive and in electrical communication with said second optically transparent electrical conduction layer.

4. The system of claim 1, wherein an incident light from a remote system is modulated by said photonic crystal beads to produce a coded data transmission for communication back to said remote system as a modulated light, and wherein said plurality of spherical retro-reflective elements direct said modulated light substantially back in a direction of said remote system.

5. The system of claim 1, wherein an incident light on the system is modulated by said photonic crystal beads to produce a modulated light that provides visual information regarding a stimulus to said photonic crystal beads selected from the group consisting of an electrical stimulus, an electrostatic stimulus, a magnetic stimulus, an electromagnetic stimulus, an optical stimulus, a pressure stimulus, a temperature stimulus, a biological stimulus, and a chemical stimulus.

6. A system, comprising:
    a substrate;
    a first electrical layer on said substrate;
    a second optically transparent electrical layer; and
    a plurality of beads disposed between said first electrical layer and said second electrical layer, said plurality of photonic crystal beads shaped substantially into a corner-cube retro-reflective pattern such that light incident on the system from a source is reflected substantially back in a direction approximating said source; and
wherein said beads modulate a reflectivity of the system in response to an electric field between said first electrical layer and said second optically transparent electrical layer.

7. The system of claim 6, wherein said beads are photonic crystal beads and said beads are fixed in said corner-cube retro-reflective pattern.

8. The system of claim 7, wherein said photonic crystal beads are deposited into said corner-cube retro-reflective pattern by a technique selected from the group consisting of ink-jet layering, small scale positioning techniques, electrostatic positioning, chemical etching, mechanical etching, and low pressure vapor deposition.

9. The system of claim 7, wherein an incident light on the system is modulated by said photonic crystal beads to produce a modulated light that provides a visual information relating to a sensor stimulus selected from the group consisting of an electrical stimulus, an electrostatic stimulus, a magnetic stimulus, an electromagnetic stimulus, an optical stimulus, a pressure stimulus, a temperature stimulus, a biological stimulus, and a chemical stimulus.

10. The system of claim 6, wherein said beads are bi-static display beads comprising a plurality of substantially reflective beads and a plurality of substantially light-absorbing beads, one of said plurality of substantially reflective beads and said plurality of substantially light-absorbing beads moving dynamically into said corner-cube retro-reflective pattern in response to a change in direction of said electric field.

11. The system of claim 6, wherein an incident light from a remote system is modulated by a reflectivity of said beads to produce a coded data transmission for communication back to said remote system as a modulated light, and wherein said corner-cube retro-reflective pattern directs said modulated light substantially back in a direction of said remote system.

* * * * *